United States Patent
Lu et al.

(10) Patent No.: US 11,641,866 B2
(45) Date of Patent: May 9, 2023

(54) METHOD FOR PREPARING CASSAVA FLOUR WITH LOW CONTENT OF CYANOGENIC GLYCOSIDES

(71) Applicant: Zhejiang University, Zhejiang (CN)

(72) Inventors: Baiyi Lu, Zhejiang (CN); Yongheng Zhong, Zhejiang (CN); Tao Xu, Zhejiang (CN); Shengyang Ji, Zhejiang (CN); Qi Chen, Zhejiang (CN); Xiaodan Wu, Zhejiang (CN)

(73) Assignee: Zhejiang University, Hangzhou (CN)

( * ) Notice: Subject to any disclaimer, the term of this patent is extended or adjusted under 35 U.S.C. 154(b) by 289 days.

(21) Appl. No.: 17/197,053

(22) Filed: Mar. 10, 2021

(65) Prior Publication Data

US 2021/0195927 A1 Jul. 1, 2021

Related U.S. Application Data

(63) Continuation-in-part of application No. PCT/CN2019/124707, filed on Dec. 11, 2019.

(30) Foreign Application Priority Data

Dec. 27, 2018 (CN) .......................... 201811608441.4
Feb. 26, 2019 (CN) .......................... 201910142016.9

(51) Int. Cl.
*A23L 5/20* (2016.01)
*A23L 19/10* (2016.01)
(Continued)

(52) U.S. Cl.
CPC .................. *A23L 5/25* (2016.08); *A23L 5/21* (2016.08); *A23L 5/32* (2016.08); *A23L 19/11* (2016.08); *A23P 10/40* (2016.08); *A23V 2002/00* (2013.01)

(58) Field of Classification Search
CPC ..... A23L 5/25; A23L 5/21; A23L 5/32; A23L 19/11; A23L 19/01; A23L 3/54; A23P 10/40; Y02A 40/90
See application file for complete search history.

(56) References Cited

U.S. PATENT DOCUMENTS

| | | | | |
|---|---|---|---|---|
| 3,433,668 A | * | 3/1969 | Hein | A23L 19/11 127/66 |
| 3,743,523 A | * | 7/1973 | Bodine | A23L 5/32 366/124 |

(Continued)

FOREIGN PATENT DOCUMENTS

| | | |
|---|---|---|
| CN | 104172018 A | 12/2014 |
| CN | 103330111 B | 9/2015 |

(Continued)

OTHER PUBLICATIONS

Translation of KR 102396746B1 (Year: 2022).*

(Continued)

*Primary Examiner* — Drew E Becker (57) ABSTRACT

A method for preparing cassava flour with a low content of cyanogenic glycosides is provided. The method includes: washing, peeling, and cutting newly harvested fresh cassava to obtain cassava pellets, cassava shreds, or a cassava pulp as a raw material. The method further includes the following steps: immersing the raw material in a solution containing cellulase and pectinase for 10-30 minutes, and then placing the raw material in warm water with a temperature of 35-50° C. and a pH value of 5.5-6.5 and ultrasonicating for 10-30 minutes at an ultrasonic frequency of 50-80 kHz, to obtain an ultrasonicated raw material; drying and pulverizing the ultrasonicated raw material to obtain cassava flour with a low content of cyanogenic glycosides, a cyanogenic glycoside content of the cassava flour is less than 15 mg/kg.

18 Claims, 2 Drawing Sheets

(51) Int. Cl.
*A23L 5/30* (2016.01)
*A23P 10/40* (2016.01)

(56) References Cited

U.S. PATENT DOCUMENTS

| | | | | |
|---|---|---|---|---|
| 4,209,539 | A * | 6/1980 | Banigan | A23L 5/276 536/4.1 |
| 5,113,881 | A * | 5/1992 | Lin | A23N 12/02 134/1 |
| 5,498,431 | A * | 3/1996 | Lindner | A23L 5/32 47/DIG. 12 |
| 6,514,349 | B1 * | 2/2003 | Meldrum | A23B 7/015 134/1 |
| 2007/0154571 | A1 * | 7/2007 | Cao | B01D 11/0261 424/725 |
| 2010/0303974 | A1 * | 12/2010 | Wu | A23L 27/10 426/238 |
| 2014/0317777 | A1 * | 10/2014 | Sayre | C12N 15/8251 800/278 |
| 2019/0059655 | A1 * | 2/2019 | Chen | A47J 27/004 |

FOREIGN PATENT DOCUMENTS

| | | |
|---|---|---|
| CN | 107632093 B | 7/2020 |
| KR | 20060133663 A | 12/2006 |
| WO | WO-2012003225 A1 * 1/2012 | ............. A23L 19/11 |

OTHER PUBLICATIONS

Translation of CN 104172018A (Year: 2014).*
Translation of CN 1631202A (Year: 2005).*
Translation of CN 108850927A (Year: 2018).*
Translation of NL 2019034B1 (Year: 2018).*
Translation of EP 747396A1 (Year: 1996).*
International search report of PCT Patent Application No. PCT/CN2019/124707 dated Mar. 12, 2020.
Standard for Sweet Cassava, Codex Alimentarius International Food Standards, Codex Stan 238, 2003, pp. 1-4.
Standard for Bitter Cassava, Codex Alimentarius International Food Standards, Codex Stan 300, 2010, pp. 1-4.

* cited by examiner

METHOD FOR PREPARING CASSAVA FLOUR WITH LOW CONTENT OF CYANOGENIC GLYCOSIDES

CROSS-REFERENCE TO RELATED APPLICATIONS

This application is a continuation-in-part application of PCT patent application No. PCT/CN2019/124707 filed on Dec. 11, 2019, which claims priority of Chinese Patent Application No. 201811608441.4 filed on Dec. 27, 2018 and Chinese Patent Application No. 201910142016.9 filed on Feb. 26, 2019. The entire content of the above-identified applications is incorporated herein by reference.

FIELD

The present application relates to the technical field of food production and preservation, and in particular relates to cassava flour with a low content of cyanogenic glycosides and a method for preparing the same.

BACKGROUND

Cyanogenic glycosides are a class of secondary metabolites of glycosidic plants that can be hydrolyzed to produce highly toxic hydrocyanic acid. Cyanogenic glycosides are also known cyanohydrin glycosides. They can be found in plants such as legumes, rosaceae, euphorbiaceae. Many of these plants are edible including cassava, almonds, flaxseeds, and etc. Two enzymes are involved in the reaction of a cyanogenic glycoside degraded into hydrocyanic acid in plants. The cyanogenic glycoside is firstly decomposed to produce a cyanohydrin and saccharide under the presence of β-glucosidase. Cyanohydrin is very unstable and slowly decomposes into ketone or aldehyde compound, and hydrocyanic acid. The second step can be accelerated by a hydroxynitrile lyase. Cyanogenic glycosides and β-glucosidase are present in different parts of plants. When a plant containing a cyanogenic glycoside is chewed or crushed, its cell structure is destroyed, allowing the β-glucosidase to interact with the cyanogenic glycoside to produce hydrocyanic acid. Thus, decreasing the content of cyanogenic glycosides can reduce the risk of hydrocyanic acid poisoning. Destroying the cell structure in advance to increase the contact between β-glucosidase and cyanogenic glycosides can reduce the content of cyanogenic glycosides in plants. Structures of cyanogenic glycosides in different plants are different. Structures and the substrate specificity of β-glucosidase are also different. Different processing and conditions also have different effects on the activity of β-glucosidase. The main substrate of β-glucosidase in cassava is linamarin, and therefore β-glucosidase from cassava is also called linamarase.

Cassava (scientific name: *Manihot esculenta*) is an important food crop in tropical and subtropical regions. The global production yield of cassava have reached 270 million tons in 2014, and the Food and Agriculture Organization of the United Nations also listed cassava as the fourth most important crop for developing countries. Cassava tubers are rich in starch, and cassava starch is widely used as food, feed and industrial raw materials. In the Codex Standards of the International Codex Alimentarius Commission, CODEX STAN 238 and CODEX STAN 300 respectively stipulate standards for sweet cassava and bitter cassava. Cassava with a hydrocyanic acid content higher than 50 mg per kilogram by fresh weight is bitter cassava, and cassava having a hydrocyanic acid content lower than that is sweet cassava. Hydrocyanic acid in cassava is derived from linamarin and lotaustralin contained in cassava, among which linamarin constitutes about 90% of the total cyanogenic glycosides and lotaustralin constitutes about 10% of the total cyanogenic glycosides. Excessive consumption of fresh cassava may cause acute poisoning, and long-term consumption of cassava may also cause chronic diseases such as neurological ataxia. Therefore, in order to promote the development of cassava industry, methods for degrading cyanogenic glycosides in cassava are studied and developed to reduce risks caused by the consumption of cassava.

Chinese patent application No. CN201310304627.1 discloses "A method for fast detoxifying cassava flour", which includes steps of: collecting, peeling, and washing fresh cassava having a cassava starch content of not less than 26.3%; crushing the fresh cassava, adding water into the crushed fresh cassava to form a pulp with a mass ratio of the fresh cassava to water being 1:0.8, and passing the pulp through an 80-mesh sieve; dehydrating the pulp using a plate-and-frame filter press, filter pressing the pulp at 1.8 MPa for 10 minutes; adding water into the dehydrated material to dilute the same and obtain a pulp with a solid content of 60%, stirring the pulp at 30 r/min for 20 minutes, and then filter pressing the pulp with a plate-and-frame filter press at 1.7 MPa for 14 minutes; adding water again into the dehydrated material to dilute the same and obtain a pulp with a solid content of 60%, stirring the pulp at 35 r/min for 25 minutes, and then filter pressing the pulp with a belt filter press at 0.4 MPa; pre-drying the resulted material to a moisture content of 33% using 6.5 kg of high-pressure steam; drying the resulted material to a moisture content of less than 13.57% using 7.5 kg of high-pressure steam; and pulverizing the material and then passing it through a 120-mesh sieve to obtain detoxified cassava flour. This method can be used to obtain cassava flour having a low-hydrocyanic acid and it imposes no requirement on the content of hydrocyanic acid in the raw material, but repeated processes of dilution and dehydration will lead to serious loss of soluble nutrients in the cassava, as well as high time cost, high energy and water consumption.

Chinese patent application No. CN201410391720.5 discloses "A method for producing whole sweet cassava flour", which includes steps of: washing fresh cassava and removing cassava bark; crushing the cassava using a crushing device to obtain cassava pellets with a granular size of less than or equal to 3 mm; naturally drying or air-drying the cassava pellets at 40-50° C. to a moisture content of less than or equal to 15.0% to obtain dried cassava pellets; subjecting the dried cassava pellets to primary crushing in a dry mill and passing the crushed cassava through a 50-70 mesh sieve; and then subjecting the cassava to secondary crushing and passing the cassava through a 100-mesh sieve to obtain whole cassava flour. This method can be used to obtain whole cassava flour containing all substances except the cassava bark, but it requires that the cassava raw material be sweet cassava with a hydrocyanic acid content of not more than 50 mg/kg. However, Chinese patent application No. CN201310304627.1 discloses "A method for fast detoxifying cassava flour", wherein hydrocyanic acid contents in various cassava varieties (series) are determined, and results show that the hydrocyanic acid contents in most samples are greater than 50 mg/kg. Therefore, although the whole sweet cassava flour obtained by this method has very low hydrocyanic acid content, this method is not suitable for cassava raw materials with high hydrocyanic acid contents.

Ultrasound refers to the sound wave whose frequency exceeds the hearing limit (20 kHz) of human ears. According to its different applications in food industry, ultrasound can be divided into two categories: high-frequency (100 kHz-1 MHz) and low-power (<1 W/cm$^2$) ultrasound; and low-frequency (20-100 kHz) and high-power (10-1000 W/cm$^2$) ultrasound. High-frequency and low-power ultrasound is mostly used in non-destructive analysis and quality evaluation, such as evaluating the hardness and maturity degree of food. Low-frequency and high-intensity ultrasound is also called power ultrasound, which is often used in food modification, such as sterilizing food to extend its shelf life and degrading pesticide residues and the like. Frequency is one of the critical factors influencing applications of ultrasound. Ultrasound with different frequencies may produce opposite effects. Cavitation effect is the main principle for the applications of ultrasound in food industry. The cavitation effect refers to the phenomenon in which tiny bubbles form, grow, and break up in a flowing liquid. The breakup of cavitation bubbles results in localized high-temperature (up to 5500° C.) and high-pressure (up to 50 MPa) hot spots in the bubbles, which can accelerate the rupture of cells, thereby promoting dissolution of biologically active substances in the cells, and increasing the possibility of contact between a substrate and an enzyme as well as generation of free radicals in a medium. Chinese patent application No. CN201710840986.7 discloses "A method of ultrasonic degradation of mycotoxins", in which an aqueous solution containing two or more selected from aflatoxin B 1, deoxynivalenol, zearalenone, and ochratoxin is treated using ultrasound of 20 kHz and 100-550 W, and results show that the ultrasound can efficiently degrade these mycotoxins, with a maximum degradation rate of 96.4%.

In addition to the physical mechanical effect of the cavitation effect, which directly accelerates the reaction, current experiments have also shown that ultrasound can effectively increase catalytic activity of an enzyme and increase the efficiency of enzymatic reactions. A catalytic enzyme can be activated by low-intensity ultrasound for a short time, but when a treatment is applied at a too high power for a too long time, an enzyme may be inactivated. Different enzymes have different responses to an ultrasonic frequency, ultrasonic intensity, and time of ultrasonic treatment. The mechanical shearing force generated by the cavitation effect of ultrasound can directly modify the structure of an enzyme, such as loosening an enzyme aggregate and exposing its active site, thereby increasing the activity of the enzyme. However, applying an ultrasonic treatment at a high intensity or for a long time will also lead to generation of a large number of active free radicals and a too strong mechanical shearing force, thus destroying the structure of the enzyme and inactivating the enzyme. Cyanogenic glycosides in cassava are present in cytoplasm, and linamarase, which can degrade cyanogenic glycosides to produce hydrocyanic acid, is present in cell wall of cassava. Treatment with cellulase and pectinase can facilitate detaching of the linamarase from the cell wall. By controlling temperature and pH value of water in which cassava is immersed, activity of linamarase can also be maintained at a relatively high level. Ultrasonic treatment can promote contact between cyanogenic glycosides and linamarase. Ultrasound treatment at an appropriate frequency and intensity for an appropriate period of time may also promote the activity of linamarase, thereby accelerating degradation of cyanogenic glycosides into volatile hydrocyanic acid, and thus reducing content of cyanogenic glycosides and hydrocyanic acid in cassava products. However, there is no research report on use of ultrasound in combination with cell wall enzymes to remove linamarin and lotaustralin.

SUMMARY

The technical problems to be solved by the present application are to provide cassava flour with a low content of cyanogenic glycosides and a method for preparing the same. The obtained cassava flour has a cyanogenic glycoside content of less than 15 mg/kg. The method of the present application is simple to perform and easy to realize, and it does not adversely affect nutritional quality of the cassava flour such as starch content and the like. There is no limitation for selecting cassava materials in the method. Both sweet cassava and bitter cassava can be processed according to the method of the present application.

In order to solve the above technical problems, a method for preparing cassava flour with a low content of cyanogenic glycosides is provided by the present application. The method includes: washing, peeling and cutting fresh cassava (newly harvested fresh cassava) to obtain cassava pellets, cassava shreds, or a cassava pulp as a raw material. The method further includes the following steps:

immersing the raw material in warm water with a temperature of 35-50° C. and ultrasonicating for 10-30 minutes at an ultrasonic frequency of 50-80 kHz to obtain an ultrasonicated raw material; and drying and pulverizing the ultrasonicated raw material to obtain cassava flour with a low content of cyanogenic glycosides.

As an improvement of the method for preparing cassava flour with a low content of cyanogenic glycosides according to the present application, an ultrasonic power corresponding to each 5 kilograms of the ultrasonicated raw material is 500-3000 watts (i.e., an ultrasonic power corresponding to each kilogram of the raw material is 100-600 watts). Preferably, an ultrasonic power corresponding to each kilogram of the raw material is 600 watts.

As an improvement of the method for preparing cassava flour with a low content of cyanogenic glycosides according to the present application, the raw material is immersed in warm water with a pH value of 5.5-6.5 and is ultrasonicated.

As a further improvement of the method for preparing cassava flour with a low content of cyanogenic glycosides according to the present application, the raw material is immersed in a solution containing cellulase and pectinase for 10-30 minutes before the ultrasonication.

As a further improvement of the method for preparing cassava flour with a low content of cyanogenic glycosides according to the present application, the ultrasonicated raw material is dried to a moisture content of less than or equal to 13.0% (wt %) and is pulverized up to being able to pass through an 80-mesh sieve.

As a further improvement of the method for preparing cassava flour with a low content of cyanogenic glycosides according to the present application, the drying is natural sun drying or hot air drying. When using the hot air drying, the temperature is lower than or equal to 70° C.

As a further improvement of the method for preparing cassava flour with a low content of cyanogenic glycosides according to the present application, the fresh cassava is sweet cassava or bitter cassava.

The sweet cassava is SC9 cassava, SC12 cassava, SC6068 cassava, GR9 cassava, GR10 cassava, GR891 cassava, bread cassava, or Limin I cassava; and the bitter cassava is SC6 cassava, SC7 cassava, SC8 cassava, SC124 cassava, SC201 cassava, GR4 cassava, GR911 cassava, or F499 cassava.

Cassava flour with a low content of cyanogenic glycosides is also provided by the present application, the cassava flour with a low content of cyanogenic glycosides are prepared according to the above-described method, a total content of cyanogenic glycosides is less than 15 mg/kg and a hydrocyanic acid content is less than 2 mg/kg.

In the method according to the present application, a method for preparing the cassava pellets, the cassava shreds, or the cassava pulp includes steps of:

a. washing newly harvested fresh cassava with pressurized water to remove residual soil from surface thereof, and then removing outer bark and inner bark of the cassava using a cassava peeling machine or manually to obtain cassava flesh; and b. cutting the cassava flesh into cassava pellets using a chopper, or shredding the cassava flesh into cassava shreds using a shredder, or crushing the cassava flesh into a pulp using a crusher, for later use.

The cassava flour with a low content of cyanogenic glycosides according to the present application has a total content of cyanogenic glycosides of less than 15 mg/kg and a hydrocyanic acid content of less than 2 mg/kg. It has inherent white, light yellow, and pink colors or other colors inherent to cassava tubers, as well as flavors that raw materials of cassava starch and cassava flour should have. It has no other flavors and no visible black spots or mildew spots.

Compared with the prior art, the present application provides cassava flour with a low content of cyanogenic glycosides, the total cyanogenic glycosides content is less than 15 mg/kg, and the method is simple to perform and efficient.

The method is suitable for both sweet cassava and bitter cassava, and can effectively reduce the cyanogenic glycosides content in cassava flour without significant influences on other nutritional qualities such as starch content, protein content, and fat content. The method is simple to perform, efficient, and includes no ripening process, and the obtained cassava flour has a great potential for further processing.

BRIEF DESCRIPTION OF THE DRAWINGS

Specific embodiments of the present application will be further described in details in conjunction with the accompanying drawings.

DETAILED DESCRIPTION OF THE EMBODIMENTS

The present application will be further described below in conjunction with specific embodiments. The protection scope of the present application, however, is not limited to these specific embodiments.

Fresh cassava raw material used in the following embodiments, unless otherwise specified, is all SC9 cassava produced in Baisha Li Autonomous County, Hainan province.

The "%" used in the following embodiments, unless otherwise specified, is all percentages by mass. Production water used in the following embodiments meets standards for drinking water. Cassava pellets have a particle size of about 3 mm. Cassava shreds have a cross-sectional diameter of about 3-4 mm and a length of about 2 cm.

Example 1

Fresh cassava harvested within two days was washed and cleaned. Inner bark and outer bark of the cassava were removed manually to ensure that there was no residue of cassava bark which would affect the content of cyanogenic glycosides in cassava flour. Obtained cassava flesh was cut using a chopper to obtain cassava pellets.

5 kg of the obtained cassava pellets was immersed in 7500 mL of warm water with a temperature of 35° C. Resulted mixture was placed in an ultrasonic apparatus and ultrasonicated at a frequency of 20 kHz and a power of 500 watts for 10 minutes.

The ultrasonicated cassava pellets were taken out, filtered to remove the water, and then dried with an electrothermal blowing dry box at 40° C. to a moisture content of 10.2% to obtain dried cassava pellets.

The dried cassava pellets were pulverized with a dry mill and passed through an 80-mesh steel sieve to obtain cassava flour.

Example 2

Fresh cassava harvested within two days was washed and cleaned. Inner bark and outer bark of the cassava were removed using a cassava peeling machine to ensure that there was no residue of cassava bark which would affect the content of cyanogenic glycosides in cassava flour.

Obtained cassava flesh was cut using a shredder to obtain cassava shreds.

5 kg of the obtained cassava shreds was immersed in 7500 mL of warm water with a temperature of 40° C. Resulted mixture was placed in an ultrasonic apparatus and ultrasonicated at a frequency of 53 kHz and a power of 1500 watts for 15 minutes.

The ultrasonicated cassava shreds were taken out and dried with an electrothermal blowing dry box at 50° C. to a moisture content of 9.6% to obtain dried cassava shreds.

The dried cassava shreds were pulverized with a dry mill and passed through an 80-mesh steel sieve to obtain cassava flour.

Example 3

Fresh cassava harvested within two days was washed and cleaned. Inner bark and outer bark of the cassava were removed manually to ensure that there was no residue of cassava bark which would affect the content of cyanogenic glycosides in cassava flour.

Obtained cassava flesh was cut using a chopper to obtain cassava pellets.

5 kg of the obtained cassava pellets was immersed in 7500 mL of warm water with a temperature of 45° C. Resulted mixture was placed in an ultrasonic apparatus and ultrasonicated at a frequency of 70 kHz and a power of 2200 watts for 20 minutes.

The ultrasonicated cassava pellets were taken out, filtered to remove the water, and then dried with an electrothermal blowing dry box at 40° C. to a moisture content of 11.3% to obtain dried cassava pellets.

The dried cassava pellets were pulverized with a dry mill and passed through an 80-mesh steel sieve to obtain cassava flour.

Example 4

Fresh cassava harvested within two days was washed and cleaned. Inner bark and outer bark of the cassava were removed manually to ensure that there was no residue of cassava bark which would affect the content of cyanogenic glycosides in cassava flour. Obtained cassava flesh was pulverized using a pulverizer to obtain a uniform pulp.

5 kg of the obtained cassava pulp was mixed with 7500 mL of warm water with a temperature of 50° C. Resulted mixture was placed in an ultrasonic apparatus and ultrasonicated at a frequency of 100 kHz and a power of 3000 watts for 30 minutes.

The ultrasonicated cassava pulp was filtered and dried naturally in the sun to a moisture content of 8.9% to obtain dried cassava chunks.

The dried cassava chunks were pulverized with a dry mill and passed through an 80-mesh steel sieve to obtain cassava flour.

Example 5

SC6 bitter cassava harvested within two days in Qiongzhong Li and Miao Autonomous County, Hainan province was washed and cleaned. Inner bark and outer bark of the cassava were removed using a cassava peeling machine to ensure that there was no residue of cassava bark which would affect the content of cyanogenic glycosides in cassava flour. Obtained cassava flesh was cut using a chopper to obtain cassava pellets.

5 kg of the obtained cassava pellets was immersed in 7500 mL of warm water with a temperature of 50° C. Resulted mixture was placed in an ultrasonic apparatus and ultrasonicated at a frequency of 100 kHz and a power of 3000 watts for 30 minutes.

The ultrasonicated cassava pellets were taken out, and then dried with an electrothermal blowing dry box at 55° C. to a moisture content of 10.2% to obtain dried cassava pellets.

The dried cassava pellets were pulverized with a dry mill and passed through an 80-mesh steel sieve to obtain cassava flour.

Example 6

GR911 bitter cassava harvested within two days in Dongfang city, Hainan province was washed and cleaned. Inner bark and outer bark of the cassava were removed manually to ensure that there was no residue of cassava bark which would affect the content of cyanogenic glycosides in cassava flour. Obtained cassava flesh was pulverized using a pulverizer to obtain a uniform pulp.

5 kg of the obtained cassava pulp was mixed with 7500 mL of warm water with a temperature of 50° C. Resulted mixture was placed in an ultrasonic apparatus and ultrasonicated at a frequency of 100 kHz and a power of 3000 watts for 30 minutes.

The ultrasonicated cassava pulp was filtered and dried naturally in the sun to a moisture content of 9.4% to obtain dried cassava chunks.

The dried cassava chunks were pulverized with a dry mill and passed through an 80-mesh steel sieve to obtain cassava flour.

Example 7

GR911 bitter cassava harvested within two days in Dongfang city, Hainan province was washed and cleaned. Inner bark and outer bark of the cassava were removed manually to ensure that there was no residue of cassava bark which would affect the content of cyanogenic glycosides in cassava flour. Obtained cassava flesh was pulverized using a pulverizer to obtain a uniform pulp.

5 kg of the obtained cassava pulp was mixed with 7500 mL of warm water with a temperature of 50° C. Resulted mixture was placed in an ultrasonic apparatus and ultrasonicated at a frequency of 50 kHz and a power of 3000 watts for 30 minutes.

The ultrasonicated cassava pulp was filtered and dried naturally in the sun to a moisture content of 9.0% to obtain dried cassava chunks.

The dried cassava chunks were pulverized with a dry mill and passed through an 80-mesh steel sieve to obtain cassava flour.

Example 8

GR911 bitter cassava harvested within two days in Dongfang city, Hainan province was washed and cleaned. Inner bark and outer bark of the cassava were removed manually to ensure that there was no residue of cassava bark which would affect the content of cyanogenic glycosides in cassava flour. Obtained cassava flesh was pulverized using a pulverizer to obtain a uniform pulp.

5 kg of the obtained cassava pulp was mixed with 7500 mL of warm water with a temperature of 50° C. Resulted mixture was placed in an ultrasonic apparatus and ultrasonicated at a frequency of 60 kHz and a power of 3000 watts for 30 minutes.

The ultrasonicated cassava pulp was filtered and dried naturally in the sun to a moisture content of 10.2% to obtain dried cassava chunks.

The dried cassava chunks were pulverized with a dry mill and passed through an 80-mesh steel sieve to obtain cassava flour.

Example 9

GR911 bitter cassava harvested within two days in Dongfang city, Hainan province was washed and cleaned. Inner bark and outer bark of the cassava were removed manually to ensure that there was no residue of cassava bark which would affect the content of cyanogenic glycosides in cassava flour. Obtained cassava flesh was pulverized using a pulverizer to obtain a uniform pulp.

5 kg of the obtained cassava pulp was mixed with 7500 mL of warm water with a temperature of 50° C. Resulted mixture was placed in an ultrasonic apparatus and ultrasonicated at a frequency of 70 kHz and a power of 3000 watts for 30 minutes.

The ultrasonicated cassava pulp was filtered and dried naturally in the sun to a moisture content of 9.7% to obtain dried cassava chunks.

The dried cassava chunks were pulverized with a dry mill and passed through an 80-mesh steel sieve to obtain cassava flour.

Example 10

GR911 bitter cassava harvested within two days in Dongfang city, Hainan province was washed and cleaned. Inner bark and outer bark of the cassava were removed manually to ensure that there was no residue of cassava bark which would affect the content of cyanogenic glycosides in cassava flour. Obtained cassava flesh was pulverized using a pulverizer to obtain a uniform pulp.

5 kg of the obtained cassava pulp was mixed with 7500 mL of warm water with a temperature of 50° C. Resulted mixture was placed in an ultrasonic apparatus and ultrasonicated at a frequency of 80 kHz and a power of 3000 watts for 30 minutes.

The ultrasonicated cassava pulp was filtered and dried naturally in the sun to a moisture content of 9.5% to obtain dried cassava chunks.

The dried cassava chunks were pulverized with a dry mill and passed through an 80-mesh steel sieve to obtain cassava flour.

Example 11

GR911 bitter cassava harvested within two days in Dongfang city, Hainan province was washed and cleaned. Inner bark and outer bark of the cassava were removed manually to ensure that there was no residue of cassava bark which would affect the content of cyanogenic glycosides in cassava flour. Obtained cassava flesh was pulverized using a pulverizer to obtain a uniform pulp.

5 kg of the obtained cassava pulp was mixed with 7500 mL of warm water with a temperature of 50° C. Resulted mixture was placed in an ultrasonic apparatus and ultrasonicated at a frequency of 90 kHz and a power of 3000 watts for 30 minutes.

The ultrasonicated cassava pulp was filtered and dried naturally in the sun to a moisture content of 9.8% to obtain dried cassava chunks.

The dried cassava chunks were pulverized with a dry mill and passed through an 80-mesh steel sieve to obtain cassava flour.

Example 12

GR911 bitter cassava harvested within two days in Dongfang city, Hainan province was washed and cleaned. Inner bark and outer bark of the cassava were removed manually to ensure that there was no residue of cassava bark which would affect the content of cyanogenic glycosides in cassava flour. Obtained cassava flesh was pulverized using a pulverizer to obtain a uniform pulp.

5 kg of the obtained cassava pulp was mixed with 7500 mL of warm water with a temperature of 50° C. Resulted mixture was adjusted to have a pH value of 5.5, placed in an ultrasonic apparatus and ultrasonicated at a frequency of 70 kHz and a power of 3000 watts for 30 minutes.

The ultrasonicated cassava pulp was filtered and dried naturally in the sun to a moisture content of 9.6% to obtain dried cassava chunks.

The dried cassava chunks were pulverized with a dry mill and passed through an 80-mesh steel sieve to obtain cassava flour.

Example 13

GR911 bitter cassava harvested within two days in Dongfang city, Hainan province was washed and cleaned. Inner bark and outer bark of the cassava were removed manually to ensure that there was no residue of cassava bark which would affect the content of cyanogenic glycosides in cassava flour. Obtained cassava flesh was pulverized using a pulverizer to obtain a uniform pulp.

5 kg of the obtained cassava pulp was mixed with 7500 mL of warm water with a temperature of 50° C. Resulted mixture was adjusted to have a pH value of 6, placed in an ultrasonic apparatus and ultrasonicated at a frequency of 70 kHz and a power of 3000 watts for 30 minutes.

The ultrasonicated cassava pulp was filtered and dried naturally to a moisture content of 10.1% to obtain dried cassava chunks.

The dried cassava chunks were pulverized with a dry mill and passed through an 80-mesh steel sieve to obtain cassava flour.

Example 14

GR911 bitter cassava harvested within two days in Dongfang city, Hainan province was washed and cleaned. Inner bark and outer bark of the cassava were removed manually to ensure that there was no residue of cassava bark which would affect the content of cyanogenic glycosides in cassava flour. Obtained cassava flesh was pulverized using a pulverizer to obtain a uniform pulp.

5 kg of the obtained cassava pulp was mixed with 7500 mL of warm water with a temperature of 50° C. Resulted mixture was adjusted to have a pH value of 6.5, placed in an ultrasonic apparatus and ultrasonicated at a frequency of 70 kHz and a power of 3000 watts for 30 minutes.

The ultrasonicated cassava pulp was filtered and dried naturally in the sun to a moisture content of 9.7% to obtain dried cassava chunks.

The dried cassava chunks were pulverized with a dry mill and passed through an 80-mesh steel sieve to obtain cassava flour.

Example 15

GR911 bitter cassava harvested within two days in Dongfang city, Hainan province was washed and cleaned. Inner bark and outer bark of the cassava were removed manually to ensure that there was no residue of cassava bark which would affect the content of cyanogenic glycosides in cassava flour. Obtained cassava flesh was pulverized using a pulverizer to obtain a uniform pulp.

5 kg of the obtained cassava pulp was mixed with 7500 mL of warm water with a temperature of 50° C., followed by adding 5 g of cellulase (50 U/g) and 20 g of pectinase (0.5 U/g). Resulted mixture was placed in an ultrasonic apparatus, kept still for 10 minutes, and then ultrasonicated at a frequency of 70 kHz and a power of 3000 watts for 30 minutes.

The ultrasonicated cassava pulp was filtered and dried naturally in the sun to a moisture content of 10.1% to obtain dried cassava chunks.

The dried cassava chunks were pulverized with a dry mill and passed through an 80-mesh steel sieve to obtain cassava flour.

Example 16

GR911 bitter cassava harvested within two days in Dongfang city, Hainan province was washed and cleaned. Inner bark and outer bark of the cassava were removed manually to ensure that there was no residue of cassava bark which would affect the content of cyanogenic glycosides in cassava flour. Obtained cassava flesh was pulverized using a pulverizer to obtain a uniform pulp.

5 kg of the obtained cassava pulp was mixed with 7500 mL of warm water with a temperature of 50° C., followed by adding 5 g of cellulase (50 U/g) and 20 g of pectinase (0.5 U/g). Resulted mixture was placed in an ultrasonic apparatus, kept still for 20 minutes, and then ultrasonicated at a frequency of 70 kHz and a power of 3000 watts for 30 minutes.

The ultrasonicated cassava pulp was filtered and dried naturally in the sun to a moisture content of 10.1% to obtain dried cassava chunks.

The dried cassava chunks were pulverized with a dry mill and passed through an 80-mesh steel sieve to obtain cassava flour.

Example 17

GR911 bitter cassava harvested within two days in Dongfang city, Hainan province was washed and cleaned. Inner bark and outer bark of the cassava were removed manually to ensure that there was no residue of cassava bark which would affect the content of cyanogenic glycosides in cassava flour. Obtained cassava flesh was pulverized using a pulverizer to obtain a uniform pulp.

5 kg of the obtained cassava pulp was mixed with 7500 mL of warm water with a temperature of 50° C., followed by adding 5 g of cellulase (50 U/g) and 20 g of pectinase (0.5 U/g). Resulted mixture was placed in an ultrasonic apparatus, kept still for 30 minutes, and then ultrasonicated at a frequency of 70 kHz and a power of 3000 watts for 30 minutes.

The ultrasonicated cassava pulp was filtered and dried naturally in the sun to a moisture content of 10.1% to obtain dried cassava chunks.

The dried cassava chunks were pulverized with a dry mill and passed through an 80-mesh steel sieve to obtain cassava flour.

Comparative Example 1

Reference was made to Example 2 in the Chinese patent application No. CN201310304627.1 entitled "A method for fast detoxifying cassava flour" to produce cassava flour. Details are as follows.

(1) Newly harvested fresh cassava was washed and cleaned. Inner bark and outer bark of the cassava were removed using a cassava peeling machine to ensure that there was no residue of cassava bark which would affect the content of cyanogenic glycosides in cassava flour.

(2) The washed and cleaned raw material obtained in step (1) was crushed by using water as a medium, with a ratio of the fresh cassava raw material to the water being 1:0.8. Resulted crushed material had a degree of fineness such that 100% of the crushed material could pass through an 80-mesh sieve. The obtained material then entered a next step.

(3) The material obtained in step (2) was dehydrated in a plate-and-frame filter press, the working pressure of the plate-and-frame filter press was 1.8 MPa, and the filter pressing was carried out for 10 minutes.

(4) Water was added to the material obtained in step (3). After a solid content of the material was adjusted to 60%, a speed of stirring the material was set to 30 r/min, and a stirring time was set to 20 minutes, resulted mixture was introduced into a plate-and-frame filter press for dehydration, the working pressure of the plate-and-frame filter press was 1.7 MPa, and the filter pressing was carried out for 14 minutes.

(5) Water was added to the material obtained in step (4). A solid content of the material was adjusted to 60%, a speed of stirring the material was set to 35 r/min, and a stirring time was set to 25 minutes.

(6) The material obtained in step (5) was introduced into a belt filter press for dehydration, the working pressure of the plate-and-frame filter press was 0.4 MPa. The material was continuously fed and discharged.

(7) The material obtained in step (6) was pre-dried, with a pressure of a steam used for the pre-drying being 6.5 kg, an inlet temperature being 135° C., an outlet temperature being 75° C., and a moisture content of resulted pre-dried product being 33%. The material was then dried, with a pressure of a steam used for the drying being 7.5 kg, an inlet temperature being 170° C., an outlet temperature being below 40° C., and a moisture content being less than 13.0%.

(8) The material obtained in step (7) was pulverized to enable the resulted product to have a degree of fineness such that 100% of the product could pass through a 120-mesh sieve, so as to obtain cassava flour.

Comparative Example 2

Reference was made to Example 1 in the Chinese patent application No. CN201410391720.5 entitled "A method for producing whole sweet cassava flour" to produce cassava flour. Details are as follows.

Fresh cassava harvested within two days was washed and cleaned. Inner bark and outer bark of the cassava were removed using a cassava peeling machine to ensure that there was no residue of cassava bark which would affect the content of cyanogenic glycosides in cassava flour.

The obtained cassava flesh was cut using a chopper three times to obtain cassava pellets having a particle size of less than 3 mm.

The cassava pellets were spread flat on a clean ribbon and moved to dry naturally in the sun. The sun-dried cassava pellets had a moisture content of less than 13.0%.

The naturally sun-dried cassava pellets were pulverized using a dry mill, and then sieved using a 50-mesh sieve. The part that was blocked by the sieve was pulverized again until all the material passed through the 50-mesh sieve. The coarse cassava flour obtained from the primary pulverization was further pulverized using a superfine pulverizer until all the obtained whole cassava flour could pass a 100-mesh sieve.

Comparative Example 3-1

Comparative Example 3-1 was the same as Example 4 except that the temperature of the water was changed from 50° C. to 60° C.

Comparative Example 3-2

Comparative Example 3-2 was the same as Example 4 except that the temperature of the water was changed from 50° C. to 25° C., and that the time for the ultrasonication was changed from 30 minutes to 60 minutes.

Comparative Example 4

Comparative Example 4 was the same as Example 4 except that "ultrasonicated at a frequency of 100 kHz and a power of 3000 watts for 30 minutes" was changed to "ultrasonicated at a frequency of 100 kHz and a power of 4000 watts for 25 minutes".

Comparative Example 5

Comparative Example 5 was the same as Example 9 except that "ultrasonicated at a frequency of 70 kHz and a power of 3000 watts for 30 minutes" was changed to "ultrasonicated at a frequency of 40 kHz and a power of 3000 watts for 30 minutes".

Comparative Example 6

Comparative Example 6 was the same as Example 13 except that "5 kg of the obtained cassava pulp was mixed with 7500 mL of warm water with a temperature of 50° C. Resulted mixture was adjusted to have a pH value of 6, placed in an ultrasonic apparatus" was changed to "5 kg of the obtained cassava pulp was mixed with 7500 mL of warm water with a temperature of 50° C. Resulted mixture was adjusted to have a pH value of 5, placed in an ultrasonic apparatus".

Comparative Example 7

Comparative Example 7 was the same as Example 15 except that "kept still for 10 minutes" was changed to "kept still for 5 minutes".

Enzyme activity in all the above examples or comparative examples is defined as follows: under conditions of 50° C. and pH of 6, the amount of an enzyme that catalyzes a substrate to hydrolyze and generate 1 μmol of a product per minute is defined as one enzyme activity unit (U).

Experiment 1

An ash content was determined according to the first method, the determination of total ash in foods, in "GB 5009.4-2016 National Food Safety Standard: Determination of Ash in Foods". A protein content was determined according to the first method, the Kjeldahl method, in "GB 5009.5-2016 National Food Safety Standard: Determination of Protein in Foods". A fat content was determined according to the first method, the Soxhlet extraction method, in "GB 5009.6-2016 National Food Safety Standard: Determination of Fat in Foods". A soluble saccharide content was determined according to "NY/T 2742-2015 Determination of Soluble Saccharides in Fruits and Products: 3,5-Dinitrosalicylic Acid Colorimetric Method". A starch content was determined according to the second method, the acid hydrolysis method, in "GB 5009.9-2016 National Food Safety Standard: Determination of Starch in Foods". A hydrocyanic acid content was determined according to the second method, the gas chromatography method, in the "GB 5009.36-2016 National Food Safety Standard: Determination of Cyanide in Foods".

Enzyme activity was determined using linamarin as a substrate. Specific steps are as follows.

10 g of an ultrasonicated and filtered cassava sample was weighed, followed by adding 10 mL of a buffer solution with a same pH value as that during the ultrasonication of the cassava sample. Resulted mixture was ground to extract linamarase, and then the mixture was centrifuged at 4° C. and at 10,000 g for 20 minutes. A supernatant was taken as a crude enzyme solution of linamarase. 50 μL of the crude enzyme solution was taken, following by adding 50 μL of 10 mmol/L linamarin solution and 900 μL of 10 mM phosphate buffer (with a pH value of 6.0). Resulted mixture was placed in a water bath for 30 minutes at a same temperature as that during the ultrasonication of the cassava sample. After the reaction was over, 1 mL of 0.1 mol/L NaOH was added to the reaction system to terminate the reaction. 3 mL of 1 mol/L $KH_2PO_4$ was added to adjust the pH of the reaction system to be weakly acidic, followed by adding 200 μL of 10 g/L chloramine T and reacting for 3 minutes, and then adding 5 mL of 20 g/L isonicotinic acid-barbituric acid developer and reacting for 15 minutes. Colorimetric assay was performed at 600 nm wavelength. An enzyme solution without the substrate was treated the same and taken as a blank control. Enzyme activity is defined as follows: with linamarin as a substrate, the amount of an enzyme required to generate 1 μg of cyanide ions per minute is defined as one enzyme activity unit (U).

A cyanogenic glycosides content was determined according to the LC-MS method. Specific steps are as follows.

(1) 0.1 g of a sample (accurate to 0.1 mg) was weighed and put into a 15-mL plastic centrifuge tube, followed by adding 5 mL of methanol+water (70+30, V+V). Resulted mixture was vortex oscillated for 5 seconds.

(2) The plastic centrifuge tube containing suspension obtained in step (1) was placed in water with a temperature of 25° C. and extracted for 15 minutes by being assisted by ultrasonication at 500 W and 53 kHz, followed by immediate centrifugation at 4200 r/min for 10 minutes. All supernatant was taken.

(3) 5 mL of methanol+water (70+30, V+V) was again added to the resulted residue. Resulted mixture was subjected to extraction and centrifugation under the same conditions as the above. The two resulted extracts were combined together in a 100-mL volumetric flask, diluted with water to the mark, and mixed uniformly to obtain an extract.

(4) The extract obtained in step (3) was passed through a 0.22 μm drainage filter membrane to obtain a solution to be tested.

(5) The solution to be tested obtained in step (4) was tested according to the following chromatographic and mass spectrometry conditions.

Chromatographic conditions:

a) Chromatographic column: Agilient Eclipse Plus C18 (50×2.1, 1.8 μm);

b) Mobile phases and elution conditions are shown in Table 1;

TABLE 1

| Mobile phases and gradient elution conditions | | |
|---|---|---|
| Time (min) | Mobile phase A (0.1% aqueous formic acid) (%) | Mobile phase B (Methanol) (%) |
| 0.00-0.5 | 98 | 2 |
| 0.5-3.0 | 93 | 7 |
| 3.0-7.5 | 60 | 40 |
| 7.5-8.0 | 10 | 90 |
| 8.0-10.0 | 10 | 90 | c) Column temperature: 30° C.;

d) Injection volume: 5 μL.

Conditions of mass spectrometry:

a) Ion source: ESI source;

b) Scan mode: positive ion scan mode;

c) Drying gas temperature: 325° C.;

d) Drying gas flow: 5 L/min;

e) Sheath gas temperature: 350° C.;

f) Sheath gas flow rate: 11 L/min;

g) Atomizing gas pressure: 45 Psi;

h) Capillary voltage: 3500V;

i) Determination method: multi-reaction monitoring mode;

j) Ion pairs detected and collision energy are shown in Table 2;

TABLE 2

Retention time, ion pairs detected, collision energy, and fragmentation voltage of linamarin and lotaustralin

| Serial No. | Name | Retention time (min) | Quantitative ion pair (m/z) | Qualitative ion pair (m/z) | Collision energy (V) | Fragmentation voltage (V) |
|---|---|---|---|---|---|---|
| 1 | Lotaustralin | 3.340 | 284.1/257.1 | 284.1/185.1 | 12 | 70 |
|   |   |   |   | 284.1/257.1 | 12 | 101 |
| 2 | Linamarin | 1.670 | 270.0/243.2 | 270.0/185.1 | 13 | 100 |
|   |   |   |   | 270.0/243.2 | 13 | 100 |

Contents of ash, protein, fat, starch, cyanogenic glycosides, and hydrocyanic acid in the cassava flour obtained from Examples 1 to 17, Comparative Examples 1 to 2, Comparative Example 3-1, Comparative Example 3-2, Comparative Examples 4 to 7, SC9 fresh cassava produced in Baisha Li Autonomous County, Hainan province, SC6 fresh cassava produced in Qiongzhong Li and Miao Autonomous County, Hainan province, and GR911 fresh cassava produced in Dongfang city, Hainan province were determined, and elimination rates of total cyanogenic glycosides (a sum of cyanogenic glycosides in linamarin and lotaustralin) and hydrocyanic acid were calculated. The cassava in Examples 1 to 4, Comparative Examples 1 to 2, Comparative Example 3-1, Comparative Example 3-2, and Comparative Example 4 was sweet cassava, and the cassava in Examples 5 to 17, and Comparative Examples 5 to 7 was bitter cassava. Results of contents are based on dry weight, as shown in Table 3. The SPSS 20.0 statistical software package was used for processing and analyzing data; results are expressed as mean±standard deviation (mean±SD); and comparison of means between groups was performed by t test, and $P<0.05$ indicates that a difference is statistically significant. Compared with corresponding fresh cassava, the cassava flour samples of Examples 1 to 4 have significantly reduced contents of cyanogenic glycosides and hydrocyanic acid and improved enzyme activity of linamarase (hereinafter referred to as enzyme activity); except for soluble saccharide in Example 4, no significant change is seen in other nutritional quality indexes, and loss of soluble saccharide is smaller than that in Comparative Example 1. Although contents of cyanogenic glycosides and hydrocyanic acid in the cassava flour of Comparative Example 1 are also significantly reduced, there is also significant loss in contents of ash, fat, protein, and soluble saccharide, among which the loss of soluble saccharide is particularly obvious; besides, variance of the test results for cyanogenic glycosides and hydrocyanic acid is large, which indicates low stability of the method; there is also a relatively great loss of enzyme activity due to the loss of protein. Statistically significant changes are not seen in contents of ash, starch, protein, fat, and soluble saccharide in Comparative Example 2 compared with the corresponding fresh cassava, but in Comparative Example 2 no additional treatment is performed to degrade cyanogenic glycosides, and hence no significant difference is observed between contents of cyanogenic glycosides and hydrocyanic acid as well as enzyme activity in Comparative Example 2 and those in the fresh cassava. Contents of cyanogenic glycosides and hydrocyanic acid in Examples 5 to 6 are significantly lower than those in fresh cassava, and enzyme activity in Examples 5 to 6 is also higher than that in the fresh cassava, which indicates that this method is effective in reducing the content of cyanogenic glycosides in both sweet and bitter cassava. Contents of cyanogenic glycosides and hydrocyanic acid in Comparative Example 3-1, Comparative Example 3-2, and Comparative Example 4 are all higher than those in Examples 1 to 4, which indicates that a too high power, a too high temperature or a too long treatment time may inhibit enzyme activity. Results of Examples 6 to 11 and Comparative Example 5 with respect to cyanogenic glycosides and hydrocyanic acid show that under the same power condition, ultrasonication at 50-80 kHz has a significant effect on depredation of cyanogenic glycosides and hydrocyanic acid, and that the increase in enzyme activity is potentially correlated with the degradation of cyanogenic glycosides and hydrocyanic acid. Test results of Example 9, Examples 12 to 14, and Comparative Example 6 with respect to cyanogenic glycosides and hydrocyanic acid show that: pH has an effect on the ultrasonication degradation of cyanogenic glycosides; when pH is 5.5-6.5, it has a distinct effect on promoting the degradation, and the effect is the best when pH is 6, in which case corresponding enzyme activity is also the highest. The enzyme activity in Comparative Example 6 is lower than that in Example 9, which indicates that when pH is 5, the acidity is too high, reducing the promoting effect of ultrasonication on enzyme activity. Results of Example 9, Examples 15 to 17, and Comparative Example 7 with respect to cyanogenic glycosides and hydrocyanic acid show that pretreatment with cellulase and pectinase for 10-30 minutes has a promoting effect on the ultrasonication degradation of cyanogenic glycosides. No significant difference is seen between Comparative Example 7 and Example 9, which indicates that pretreatment with the two enzymes for 5 minutes has a limited effect on the ultrasonication degradation of cyanogenic glycosides. A comparison between Example 16 and Example 17 shows that: pretreatment with the enzymes for 20 or more than 20 minutes has a limited effect on enhancing the promoting effect of the ultrasonication; the pretreatment with cellulase and pectinase has no effect on enzyme activity, which indicates that the promoting effect of the pretreatment with the two enzyme on the degradation of cyanogenic glycosides may come from the promotion of contact between linamarase and cyanogenic glycosides.

TABLE 3

Test results of nutritional quality of cassava flour and fresh cassava

| Group | Ash content (%) | Fat content (%) | Protein content (%) | Soluble saccharide (%) | Starch content (%) |
|---|---|---|---|---|---|
| Example 1 | 0.27 ± 0.02 | 0.15 ± 0.03 | 1.4 ± 0.1 | 7.1 ± 1.5 | 80.4 ± 5.5 |
| Example 2 | 0.19 + 0.03 | 0.15 ± 0.01 | 1.3 ± 0.2 | 7.6 ± 0.5 | 81.1 ± 6.3 |
| Example 3 | 0.33 + 0.04 | 0.12 ± 0.01 | 1.4 ± 0.0 | 6.5 ± 0.7 | 82.6 ± 6.4 |

TABLE 3-continued

Test results of nutritional quality of cassava flour and fresh cassava

| Group | Ash content (%) | Fat content (%) | Protein content (%) | Soluble saccharide (%) | Starch content (%) |
|---|---|---|---|---|---|
| Example 4 | 0.22 ± 0.00 | 0.14 ± 0.02 | 1.1 ± 0.1 | 4.6 ± 1.8# | 79.5 ± 4.7 |
| Example 5 | 0.37 ± 0.05 | 0.14 ± 0.04 | 2.6 ± 0.2 | 5.0 ± 1.2 | 80.2 ± 5.9 |
| Example 6 | 0.24 ± 0.08 | 0.12 ± 0.01 | 1.7 ± 0.3 | 3.2 ± 0.3# | 82.3 ± 2.2 |
| Example 7 | 0.25 ± 0.01 | 0.12 ± 0.01 | 1.9 ± 0.1 | 3.0 ± 0.2# | 81.6 ± 1.7 |
| Example 8 | 0.26 ± 0.03 | 0.13 ± 0.02 | 1.8 ± 0.3 | 3.0 ± 0.3# | 81.4 ± 1.9 |
| Example 9 | 0.24 ± 0.02 | 0.11 ± 0.03 | 1.9 ± 0.2 | 3.3 ± 0.1# | 82.6 ± 2.0 |
| Example 10 | 0.25 ± 0.01 | 0.12 ± 0.01 | 1.9 ± 0.1 | 3.0 ± 0.2# | 81.9 ± 1.2 |
| Example 11 | 0.23 ± 0.04 | 0.12 ± 0.02 | 1.6 ± 0.3 | 3.1 ± 0.3# | 82.1 ± 1.1 |
| Example 12 | 0.24 ± 0.05 | 0.11 ± 0.02 | 1.7 ± 0.2 | 3.2 ± 0.2# | 82.7 ± 1.0 |
| Example 13 | 0.21 ± 0.03 | 0.11 ± 0.01 | 1.9 ± 0.3 | 3.3 ± 0.1# | 82.2 ± 1.6 |
| Example 14 | 0.24 ± 0.02 | 0.12 ± 0.03 | 1.8 ± 0.1 | 3.0 ± 0.3# | 81.7 ± 1.8 |
| Example 15 | 0.25 ± 0.01 | 0.12 ± 0.01 | 1.6 ± 0.1 | 3.4 ± 0.2# | 81.7 ± 1.2 |
| Example 16 | 0.23 ± 0.01 | 0.12 ± 0.02 | 1.5 ± 0.2 | 3.2 ± 0.1# | 82.3 ± 1.7 |
| Example 17 | 0.23 ± 0.01 | 0.13 ± 0.02 | 1.6 ± 0.1 | 3.0 ± 0.3# | 82.4 ± 1.9 |
| Comparative Example 1 | 0.17 ± 0.01# | 0.06 ± 0.01# | 0.7 ± 0.3# | 0.1 ± 0.0# | 86.5 ± 9.2 |
| Comparative Example 2 | 0.22 ± 0.04 | 0.15 ± 0.01 | 1.5 ± 0.5 | 6.4 ± 2.3 | 82.1 ± 8.4 |
| Comparative Example 3-1 | 0.30 ± 0.02 | 0.11 ± 0.02 | 1.6 ± 0.4 | 3.6 ± 0.6# | 79.4 ± 5.3 |
| Comparative Example 3-2 | 0.27 ± 0.04 | 0.13 ± 0.03 | 1.4 ± 0.1 | 3.8 ± 0.5# | 82.1 ± 4.6 |
| Comparative Example 4 | 0.24 ± 0.03 | 0.17 ± 0.01 | 1.6 ± 0.2 | 4.0 ± 0.8# | 76.4 ± 8.0 |
| Comparative Example 5 | 0.24 ± 0.01 | 0.13 ± 0.02 | 1.7 ± 0.2 | 3.2 ± 0.1# | 82.1 ± 1.1 |
| Comparative Example 6 | 0.22 ± 0.01 | 0.14 ± 0.01 | 1.8 ± 0.3 | 3.1 ± 0.3# | 82.5 ± 1.5 |
| Comparative Example 7 | 0.22 ± 0.01 | 0.11 ± 0.01 | 1.7 ± 0.1 | 3.1 ± 0.2# | 81.9 ± 1.1 |
| SC9 Fresh cassava | 0.25 ± 0.05 | 0.16 ± 0.03 | 1.5 ± 0.4 | 7.4 ± 2.1 | 79.2 ± 7.1 |
| SC6 Fresh cassava | 0.34 ± 0.09 | 0.18 ± 0.01 | 2.4 ± 0.6 | 4.8 ± 1.7 | 81.4 ± 6.6 |
| GR911 Fresh cassava | 0.29 ± 0.06 | 0.10 ± 0.04 | 2.1 ± 0.2 | 5.7 ± 0.8 | 80.5 ± 5.1 |

Note:
indicates that an index, compared with that of fresh cassava of a same variety and a same place of origin, $P < 0.05$.

TABLE 4

Contents and elimination rates of cyanogenic glycosides and hydrocyanic acid and enzyme activity in cassava flour and fresh cassava

| Group | Linamarin content (mg/kg) | Lotaustralin content (mg/kg) | Hydrocyanic acid (mg/kg) | Total cyanogenic glycosides elimination rate (%) | Hydrocyanic acid elimination rate (%) | Enzyme activity (U/g) |
|---|---|---|---|---|---|---|
| Example 1 | 7.8 ± 0.7# | 0.7 ± 0.3# | 0.8 ± 0.1# | 96.7 | 98.8 | 0.62 |
| Example 2 | 6.6 ± 0.6# | 1.3 ± 0.4# | 0.8 ± 0.0# | 98.6 | 98.8 | 0.62 |
| Example 3 | 5.3 ± 0.8# | 0.6 ± 0.1# | 0.7 ± 0.2# | 98.9 | 98.9 | 0.63 |
| Example 4 | 3.5 ± 0.4# | 0.4 ± 0.1# | 0.5 ± 0.1# | 99.3 | 99.2 | 0.65 |
| Example 5 | 11.6 ± 1.1# | 1.3 ± 0.5# | 1.6 ± 0.3# | 99.2 | 99.2 | 0.69 |
| Example 6 | 13.2 ± 0.4# | 0.7 ± 0.1# | 1.2 ± 0.3# | 99.2 | 99.4 | 0.74 |
| Example 7 | 11.0 ± 0.3# | 0.5 ± 0.2# | 1.0 ± 0.3# | 99.4 | 99.5 | 0.76 |
| Example 8 | 8.4 ± 0.2# | 0.3 ± 0.1# | 0.8 ± 0.1# | 99.5 | 99.6 | 0.77 |
| Example 9 | 7.2 ± 0.4# | 0.3 ± 0.1# | 0.7 ± 0.2# | 99.6 | 99.6 | 0.79 |
| Example 10 | 10.7 ± 0.3# | 0.6 ± 0.1# | 1.1 ± 0.1# | 99.4 | 99.4 | 0.75 |
| Example 11 | 12.9 ± 0.4# | 0.8 ± 0.1# | 1.2 ± 0.2# | 99.2 | 99.4 | 0.72 |
| Example 12 | 5.7 ± 0.3# | 0.3 ± 0.1# | 0.6 ± 0.1# | 99.7 | 99.7 | 0.83 |
| Example 13 | 4.2 ± 0.1# | 0.2 ± 0.0# | 0.4 ± 0.0# | 99.8 | 99.8 | 0.84 |
| Example 14 | 6.2 ± 0.2# | 0.3 ± 0.1# | 0.6 ± 0.1# | 99.6 | 99.7 | 0.82 |
| Example 15 | 6.4 ± 0.2# | 0.3 ± 0.1# | 0.7 ± 0.2# | 99.6 | 99.6 | 0.78 |
| Example 16 | 4.1 ± 0.1# | 0.2 ± 0.0# | 0.5 ± 0.1# | 99.8 | 99.8 | 0.79 |
| Example 17 | 4.0 ± 0.1# | 0.2 ± 0.0# | 0.4 ± 0.0# | 99.8 | 99.8 | 0.79 |
| Comparative Example 1 | 61.8 ± 47.0# | 6.90 ± 5.0# | 7.2 ± 5.3# | 87.7 | 89.1 | 0.11 |
| Comparative Example 2 | 499.6 ± 28.8 | 52.7 ± 6.9 | 60.4 ± 8.2 | 0.9 | 8.8 | 0.60 |
| Comparative Example 3-1 | 15.7 ± 1.4# | 2.2 ± 0.6# | 2.7 ± 0.8# | 96.8 | 95.9 | 0.61 |

TABLE 4-continued

Contents and elimination rates of cyanogenic glycosides and hydrocyanic acid
and enzyme activity in cassava flour and fresh cassava

| Group | Linamarin content (mg/kg) | Lotaustralin content (mg/kg) | Hydrocyanic acid (mg/kg) | Total cyanogenic glycosides elimination rate (%) | Hydrocyanic acid elimination rate (%) | Enzyme activity (U/g) |
|---|---|---|---|---|---|---|
| Comparative Example 3-2 | 8.2 ± 1.0# | 1.5 ± 0.4# | 2.0 ± 0.5# | 98.2 | 97.0 | 0.58 |
| Comparative Example 4 | 9.1 ± 2.0# | 1.4 ± 0.5# | 2.2 ± 0.7# | 98.1 | 96.7 | 0.57 |
| Comparative Example 5 | 14.6 ± 0.4# | 1.0 ± 0.2# | 1.5 ± 0.3# | 99.1 | 97.7 | 0.70 |
| Comparative Example 6 | 30.4 ± 0.7# | 3.9 ± 0.3# | 3.4 ± 0.3# | 98.1 | 98.3 | 0.76 |
| Comparative Example 7 | 7.1 ± 0.3# | 0.3 ± 0.1# | 0.7 ± 0.2# | 99.6 | 99.6 | 0.78 |
| SC9 Fresh cassava | 501.1 ± 31.4 | 56.2 ± 5.5 | 66.2 ± 5.8 | / | / | 0.60 |
| SC6 Fresh cassava | 1603.8 ± 103.9 | 112.6 ± 17.1 | 193.1 ± 26.5 | / | / | 0.62 |
| GR911 Fresh cassava | 1674.4 ± 102.6 | 107.5 ± 12.3 | 202.9 ± 25.7 | / | / | 0.65 |

Notes:
indicates that an index, compared with that of fresh cassava of a same variety and a same place of origin, P < 0.05.
Enzyme activity is counted as the enzyme activity per gram of a cassava sample.

Experiment 2

Substrate specificity of cassava linamarase was determined. Specific steps are as follows.

Cassava linamarase was obtained by separation and purification in our laboratory, and was prepared into a 10 U/mL solution (using linamarin as a substrate) using 0.05 mol/L phosphate buffer (pH=6). 50 μL of crude enzyme solution was weighed, followed by adding 50 μL of 10 mmol/L linamarin solution or amygdalin solution, and 900 μL of 10 mM phosphate buffer (pH 6.0). Resulted mixture was placed in a water bath for 30 minutes at the same temperature as that during ultrasonication. After the reaction was over, 1 mL of 0.1 mol/L NaOH was added to the reaction system to terminate the reaction. 3 mL of 1 mol/L $KH_2PO_4$ was added to adjust the pH of the reaction system to be weakly acidic, followed by adding 200 μL of 10 g/L chloramine T and reacting for 3 minutes, and then adding 5 mL of 20 g/L isonicotinic acid-barbituric acid developer and reacting for 15 minutes. Colorimetric assay was then performed at 600 nm wavelength. An enzyme solution without the substrate was treated the same and was taken as a blank control. Enzyme activity is defined as follows: with linamarin as the substrate, in an environment with a temperature of 50° C. and pH of 6, the amount of enzyme required to generate 1 μg of cyanide ion per minute is defined as one enzyme activity unit (U). Results are shown in Table 5.

TABLE 5

Substrate specificity of cassava linamarase

| | Linamarin substrate | Amygdalin substrate |
|---|---|---|
| Enzyme activity (U/mL) | 10.04 | 0.08 |

The cassava linamarase has very strong substrate specificity, and it has almost no activity for catalytic degradation of amygdalin, while the β-glucosidase in almonds definitely has a strong catalytic activity for amygdalin. This indirectly shows that there should be structural differences between cassava-derived β-glucosidase and almond-derived β-glucosidase, which leads to their substrate selectivity.

Experiment 3

Effects of ultrasonication on β-glucosidase derived from different sources were determined. Specific steps are as follows.

Certain amounts of β-glucosidase derived from respective different sources (almond-derived β-glucosidase and *Aspergillus niger*-derived β-glucosidase were purchased from Shanghai Yuanye Biotechnology Co., Ltd., and cassava-derived β-glucosidase (linamarase) was obtained by separation and purification in our laboratory) were weighed, and prepared respectively into 10 U/mL solutions by using 0.05 mol/L phosphate buffer (pH=6). Each of the prepared solutions was placed in an ultrasonic apparatus and ultrasonicated at 50° C. for 30 minutes at different frequencies and at a power density of 400 W/L. 50 μL of crude enzyme solution was weighed, followed by adding 50 μL of 10 mmol/L linamarin solution, and 900 μL of 10 mM phosphate buffer (having a pH of 6.0). Resulted mixture was placed in a water bath for 30 minutes at a same temperature as that during ultrasonication. After the reaction was over, 1 mL of 0.1 mol/L NaOH was added to the reaction system to terminate the reaction. 3 mL of 1 mol/L $KH_2PO_4$ was added to adjust the pH of the reaction system to be weakly acidic, followed by adding 200 μL of 10 g/L chloramine T and reacting for 3 minutes, and then adding 5 mL of 20 g/L isonicotinic acid-barbituric acid developer and reacting for 15 minutes. Colorimetric assay was then performed at 600 nm wavelength. An enzyme solution without a substrate was treated the same and taken as a blank control. Enzyme activity is defined as follows: with linamarin as the substrate, in an environment with a temperature of 50° C. and pH of 6, the amount of enzyme required to generate 1 μg of cyanide ions per minute is defined as one enzyme activity unit (U).

Figure 1:
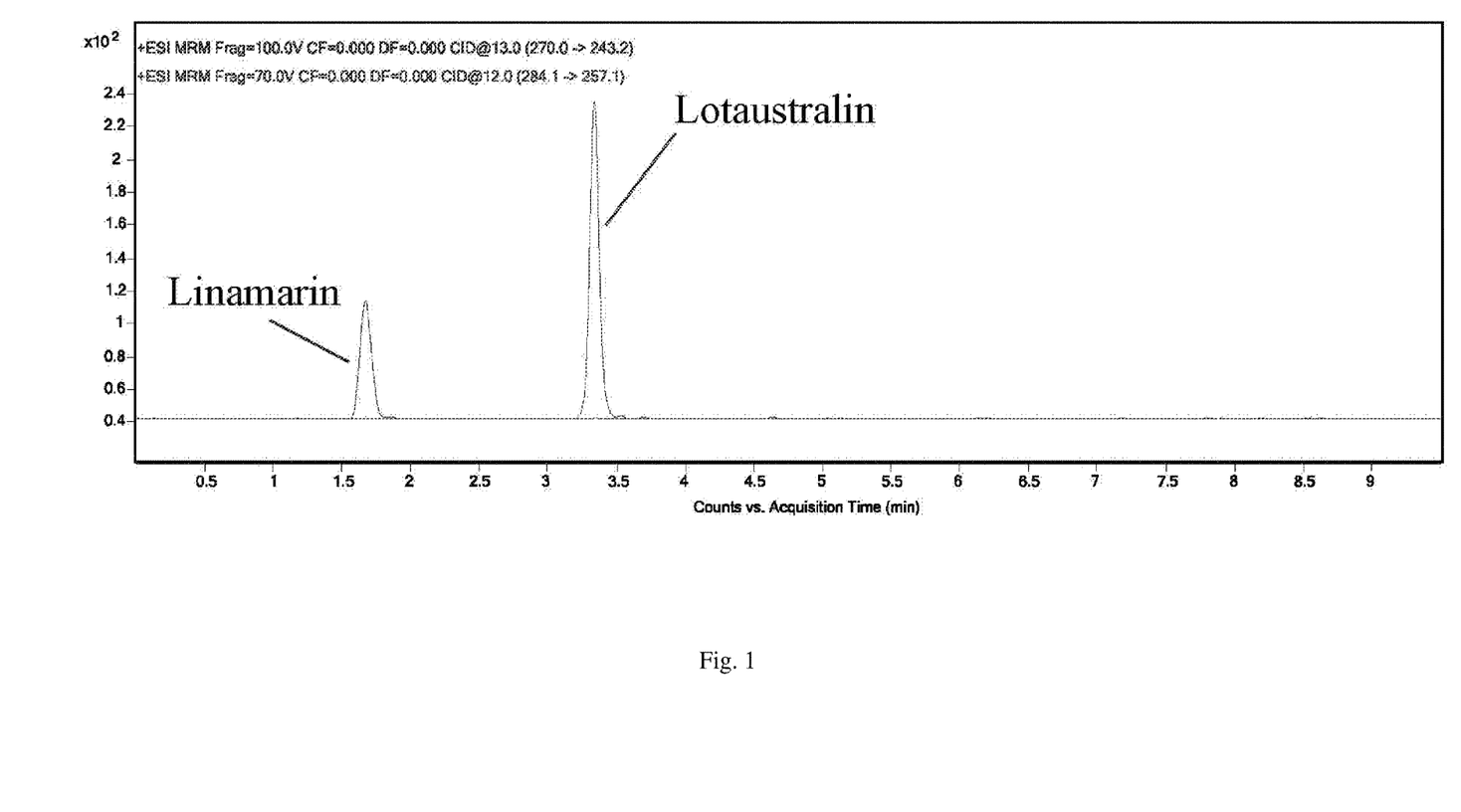
FIG. 1 is a diagram showing overlapping of MRM chromatograms of linamarin and lotaustralin.
Figure 2:
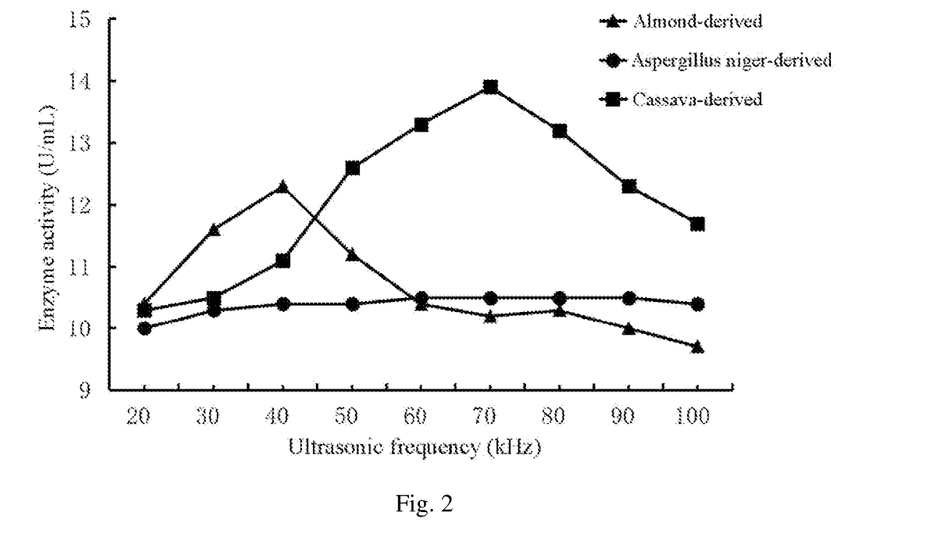
FIG. 2 is a diagram showing effects of ultrasonication at different frequencies on activity of β-glucosidase derived from almonds, *Aspergillus niger*, and cassava.

Results are shown in FIG. 2. Ultrasonication at different frequencies have different effects on the activity of β-glucosidase derived from almonds, *Aspergillus niger*, and cassava. Under the conditions of this experiment, the enzyme activity of linamarase derived from cassava is most affected by the ultrasonication. When the cassava-derived enzyme is treated by ultrasonication at different frequencies, its enzyme activity is improved to different degrees. When the cassava-derived enzyme is ultrasonicated at 50-80 kHz, its enzyme activity is greatly increased. The almond-derived β-glucosidase, after being ultrasonicated, also has increased enzyme activity which is lower than that of cassava, but its enzyme activity is better when ultrasonicated at a frequency of 30-50 kHz. The *Aspergillus niger*-derived enzyme is basically not affected by the ultrasonication under this condition.

Experiment 4

In order to further verify structural differences of β-glucosidase derived from different sources, composition of secondary structures of the enzymes derived from different sources were identified, and effects of ultrasonication on the composition of the secondary structures of β-glucosidase derived from different sources were studied. Specific steps are as follows.

2 mg of β-glucosidase derived from each of various sources (almond-derived β-glucosidase and *Aspergillus niger*-derived β-glucosidase were purchased from Shanghai Yuanye Biotechnology Co., Ltd., and cassava-derived β-glucosidase (linamarase) was obtained by separation and purification in our laboratory) was weighed, followed by adding 100 mg of dried potassium bromide. Each of the resulted mixtures was ground in an agate mortar and then pressed into thin tablets using a tablet press. Absorbance of the tablets within 4000-400 $cm^{-1}$ was measured by a Fourier transform infrared spectrometer, and amide I band (1700-1600 $cm^{-1}$) was processed by peak separation. The content of each secondary structure was obtained by fitting. β-glucosidase derived from each source, after being ultrasonicated at 50 kHz and at 50° C. for 30 minutes, was subjected to secondary structure identification. Results are shown in Table 6. After the ultrasonication, the secondary structure of *Aspergillus niger*-derived β-glucosidase is relatively stable and does not change significantly, which is similar to the change in its enzyme activity. Significant changes are seen in almond-derived β-glucosidase and cassava-derived β-glucosidase, and the change in the cassava-derived enzyme is greater than the change in the almond-derived enzyme.

TABLE 6

Contents of secondary structures in β-glucosidase derived from different sources

| Sources of enzymes | | α-helix | β-sheet | β-turn | Random curl |
|---|---|---|---|---|---|
| *Aspergillus niger* | Control group | 45.74 | 32.02 | 22.19 | 0.05 |
| | Treated group | 45.61 | 32.05 | 22.07 | 0.27 |
| Almond | Control group | 41.72 | 24.70 | 29.76 | 3.82 |
| | Treated group | 41.35 | 22.93 | 29.04 | 6.68 |
| Cassava | Control group | 35.00 | 27.01 | 29.23 | 8.76 |
| | Treated group | 33.47 | 22.39 | 26.68 | 17.46 |

In summary, when cassava linamarase is ultrasonicated at 50-80 kHz and at 35-50° C., its structure changes, which significantly improves its activity in catalyzing the degradation of linamarin; and maintaining the ultrasonication for a certain period of time can significantly reduce the content of linamarin in cassava.

Finally, it should be noted that the above-listed are only a few specific embodiments of the present application. It is obvious that the present application is not limited to the above embodiments, and many variations are possible. All variations that can be directly derived or conceived by a person of ordinary skill in the art from the disclosure of the present application should be considered as falling within the protection scope of the present application.

The invention claimed is:

1. A method for preparing cassava flour with a low content of cyanogenic glycosides, comprising: washing, peeling, and cutting fresh cassava to obtain cassava pellets, cassava shreds, or a cassava pulp as a raw material, wherein the method further comprises the following steps:
   immersing the raw material in warm water with a temperature of 35-50° C. and ultrasonicating for 10-30 minutes at an ultrasonic frequency of 50-80 kHz to obtain an ultrasonicated raw material,
   wherein an ultrasonic power corresponding to each kilogram of the raw material is 100-600 watts; and
   drying and pulverizing the ultrasonicated raw material to obtain the cassava flour with a low content of cyanogenic glycosides, a total cyanogenic glycoside content of the cassava flour is less than 15 mg/kg and a hydrocyanic acid content is less than 2 mg/kg;
   wherein, a method for preparing the cassava pellets, the cassava shreds, or the cassava pulp comprises steps of:
   a. washing newly harvested fresh cassava with pressurized water to remove residual soil from surface thereof, and then removing outer bark and inner bark of the cassava using a cassava peeling machine or manually to obtain cassava flesh; and
   b. cutting the cassava flesh into cassava pellets using a chopper, or shredding the cassava flesh into cassava shreds using a shredder, or crushing the cassava flesh into a pulp using a crusher, for later use.

2. The method for preparing cassava flour with a low content of cyanogenic glycosides according to claim 1, wherein the ultrasonic power corresponding to each kilogram of the raw material is 600 watts.

3. The method for preparing cassava flour with a low content of cyanogenic glycosides according to claim 1, wherein the raw material is immersed in warm water with a pH value of 5.5-6.5 and is the ultrasonicated.

4. The method for preparing cassava flour with a low content of cyanogenic glycosides according to claim 1, wherein the raw material is immersed in a solution containing cellulase and pectinase for 10-30 minutes before the ultrasonication.

5. The method for preparing cassava flour with a low content of cyanogenic glycosides according to claim 1, wherein the ultrasonicated raw material is dried to a moisture content of less than or equal to 13.0% and is pulverized up to being able to pass through an 80-mesh sieve.

6. The method for preparing cassava flour with a low content of cyanogenic glycosides according to claim 5, wherein the drying is natural sun drying or hot air drying, and wherein when using the hot air drying, the temperature is lower than or equal to 70° C.

7. The method for preparing cassava flour with a low content of cyanogenic glycosides according to claim 1, wherein the fresh cassava is sweet cassava or bitter cassava.

8. The method for preparing cassava flour with a low content of cyanogenic glycosides according to claim 7, wherein:
   the sweet cassava is SC9 cassava, SC12 cassava, SC6068 cassava, GR9 cassava, GR10 cassava, GR891 cassava, bread cassava, or Limin I cassava; and
   the bitter cassava is SC6 cassava, SC7 cassava, SC8 cassava, SC124 cassava, SC201 cassava, GR4 cassava, GR911 cassava, or F499 cassava.

9. The method for preparing cassava flour with a low content of cyanogenic glycosides according to claim 2, wherein the fresh cassava is sweet cassava or bitter cassava.

10. The method for preparing cassava flour with a low content of cyanogenic glycosides according to claim 9, wherein:
   the sweet cassava is SC9 cassava, SC12 cassava, SC6068 cassava, GR9 cassava, GR10 cassava, GR891 cassava, bread cassava, or Limin I cassava; and
   the bitter cassava is SC6 cassava, SC7 cassava, SC8 cassava, SC124 cassava, SC201 cassava, GR4 cassava, GR911 cassava, or F499 cassava.

11. The method for preparing cassava flour with a low content of cyanogenic glycosides according to claim 3, wherein the fresh cassava is sweet cassava or bitter cassava.

12. The method for preparing cassava flour with a low content of cyanogenic glycosides according to claim 11, wherein:
   the sweet cassava is SC9 cassava, SC12 cassava, SC6068 cassava, GR9 cassava, GR10 cassava, GR891 cassava, bread cassava, or Limin I cassava; and
   the bitter cassava is SC6 cassava, SC7 cassava, SC8 cassava, SC124 cassava, SC201 cassava, GR4 cassava, GR911 cassava, or F499 cassava.

13. The method for preparing cassava flour with a low content of cyanogenic glycosides according to claim 4, wherein the fresh cassava is sweet cassava or bitter cassava.

14. The method for preparing cassava flour with a low content of cyanogenic glycosides according to claim 13, wherein:
   the sweet cassava is SC9 cassava, SC12 cassava, SC6068 cassava, GR9 cassava, GR10 cassava, GR891 cassava, bread cassava, or Limin I cassava; and
   the bitter cassava is SC6 cassava, SC7 cassava, SC8 cassava, SC124 cassava, SC201 cassava, GR4 cassava, GR911 cassava, or F499 cassava.

15. The method for preparing cassava flour with a low content of cyanogenic glycosides according to claim 5, wherein the fresh cassava is sweet cassava or bitter cassava.

16. The method for preparing cassava flour with a low content of cyanogenic glycosides according to claim 15, wherein:
   the sweet cassava is SC9 cassava, SC12 cassava, SC6068 cassava, GR9 cassava, GR10 cassava, GR891 cassava, bread cassava, or Limin I cassava; and
   the bitter cassava is SC6 cassava, SC7 cassava, SC8 cassava, SC124 cassava, SC201 cassava, GR4 cassava, GR911 cassava, or F499 cassava.

17. The method for preparing cassava flour with a low content of cyanogenic glycosides according to claim 6, wherein the fresh cassava is sweet cassava or bitter cassava.

18. The method for preparing cassava flour with a low content of cyanogenic glycosides according to claim 17, wherein:
   the sweet cassava is SC9 cassava, SC12 cassava, SC6068 cassava, GR9 cassava, GR10 cassava, GR891 cassava, bread cassava, or Limin I cassava; and
   the bitter cassava is SC6 cassava, SC7 cassava, SC8 cassava, SC124 cassava, SC201 cassava, GR4 cassava, GR911 cassava, or F499 cassava.

\* \* \* \* \*